United States Patent [19]
Hishinuma et al.

[11] Patent Number: 5,926,313
[45] Date of Patent: Jul. 20, 1999

[54] PHASE RETARDER FILM

[75] Inventors: Takahiro Hishinuma; Akiko Shimizu; Koji Higashi, all of Osaka-fu, Japan

[73] Assignee: Sumitomo Chemical Company, Limited, Osaka, Japan

[21] Appl. No.: 08/956,453

[22] Filed: Oct. 23, 1997

[30] Foreign Application Priority Data

Oct. 24, 1996 [JP] Japan ................................ 8-282201
Oct. 24, 1996 [JP] Japan ................................ 8-282202

[51] Int. Cl.$^6$ ........................................................ G02B 5/30
[52] U.S. Cl. ............................ 359/486; 359/492; 359/494
[58] Field of Search ............................ 349/117; 359/486, 359/492, 494

[56] References Cited

U.S. PATENT DOCUMENTS

| | | | |
|---|---|---|---|
| 4,813,768 | 3/1989 | Hamaguchi et al. | 350/347 |
| 5,430,566 | 7/1995 | Sakaya et al. | 359/73 |
| 5,504,603 | 4/1996 | Winker et al. | 359/73 |

FOREIGN PATENT DOCUMENTS

| | | |
|---|---|---|
| 0350383 | 1/1990 | European Pat. Off. . |
| 0478383 | 4/1992 | European Pat. Off. . |
| 0678567 | 10/1995 | European Pat. Off. . |
| 63-239421 | 10/1988 | Japan . |
| 3-103823 | 4/1991 | Japan . |
| 5-80323 | 4/1993 | Japan . |
| 2272779 | 5/1994 | United Kingdom . |
| WO9610773 | 4/1996 | WIPO . |

OTHER PUBLICATIONS

T. Motohiro et al., "Thin film retardation plate by oblique deposition", *Applied Optics*, vol. 28, No. 13, Jul. 1, 1989, pp. 2466–2482.

*Primary Examiner*—Cassandra Spyrou
*Assistant Examiner*—Craig H. Curtis
*Attorney, Agent, or Firm*—Sughrue, Mion, Zinn, Macpeak & Seas, PLLC

[57] ABSTRACT

As a phase retarder film in which at least one oblique evaporation layer of an inorganic dielectric having positive refractive index anisotropy and having its principal optic axis tilted 20 degrees to 70 degrees from the direction of the normal to the film is formed on at least one surface of a transparent polymer film with an intermediate layer between, a large area film is easily and inexpensivly obtained.

12 Claims, No Drawings

PHASE RETARDER FILM

BACKGROUND OF THE INVENTION

1. Field of the Invention

The present invention relates to a phase retarder film for improving viewing angle characteristics of liquid crystal displays.

2. Description of Related Art

The liquid crystal display (hereinafter, referred to as LCD) most widely used at present is a twisted nematic LCD (hereinafter, referred to as TN-LCD) of normally white (hereinafter, referred to as NW) mode in which a liquid crystal cell such that nematic liquid crystal is held between a pair of glass substrates having transparent electrodes is sandwiched between a pair of linearly polarizing films disposed so that the absorption axes thereof are perpendicular to each other. The nematic liquid crystal has an orientation structure such that the helical axis is normal to the glass substrates and the twist angle thereof is approximately 90 degrees.

When no voltage is applied, the NW mode TN-LCD is in white state since the incident linearly polarized light exits after being rotated 90 degrees because of the octical rotatory power of the liquid crystal cell. When a voltage is applied, the NW mode TN-LCD is in black state since the liquid crystal molecules stand up with respect to the glass substrates to cause the optical rotatory power to disappear and the incident linearly polarized light exits as it is. Gray scale is performed by using the white state, the black state and intermediate states therebetween.

However, the nematic liquid crystal used for the LCD has a rod like molecular structure and exhibits positive refractive index anisotropy where the refractive index is higher in the direction of the molecular axis than in the normal direction to the molecular axis, so that the polarization condition of light obliquely passing through the liquid crystal cell varies in a different direction from the direction of the normal to the liquid crystal cell because of a phase difference due to the refractive index anisotropy of the liquid crystal. For this reason, when the display on the LCD is viewed from angles other than the normal direction to the LCD, viewing angle characteristics are shown such that the contrast decreases and that gray scale inversion takes place.

Since the viewing angle characteristics are caused by the refractive index anisotropy of the liquid crystal molecules, an improvement being examined using a phase retarder film exhibiting a refractive index anisotropy opposite to that of the liquid crystal to compensate the phase difference due to the refractive index anisotropy of the liquid crystal molecules.

In improving the viewing angle characteristics, significant effects are obtained by improving the viewing angle characteristics in black state, namely in voltage applied state. In voltage applied state, liquid crystal molecules are oriented in a direction nearly perpendicular to the glass substrates. Regarding the liquid crystal cell in this state as a positive refractive index anisotropic substance having its optic axis in the normal direction to the glass substrates, Japanese Laid-open Patent Publications No. 2-015239 and 3-103823 disclose to use a phase retarder film having its optic axis in the normal direction to the film and having negative refractive index anisotropy as a phase retarder film for compensating the positive refractive index anisotropy of the liquid crystal cell.

Moreover, in the actual LCDs, liquid crystal molecules in the vicinity of the glass substrates remain tilted even in voltage applied state because of the restraint force of the orientation lavers on the substrates. In view of this fact, Japanese Laid-open Patent Publications No. 63-239491 and 6-214116 describe to use a phase retarder film having its optic axis tilted from the normal direction to the film and having negative refractive index anisotropy.

Further, Japanese Laid-open Patent Publications No. 5-080323 and 7-306406 and WO96/10773 describe that the viewing angle characteristics can be improved by using a phase retarder plate having its optic axis tilted from the normal direction to the film although having the same positive refractive index anisotropy as the liquid crystal has.

Recently, the TN-LCD has seen put to various uses such as personal computers, so that it is strongly demanded that the TN-LCD have greater size, higher definition, wider viewing angle, lighter weight and lower cost.

The use of the phase retarder film having its optic axis in the normal direction to the film and having negative refractive index anisotropy does not always show sufficient effect of the viewing angle characteristic improvement.

In the case of the use of the phase retarder film having its optic axis tilted from the normal direction to the film and having negative refractive index anisotropy, a satisfactory effect of the viewing angle characteristics improvement is obtained. However, according to a method in which the phase retarder film is cut from a polymer block oriented to exhibit negative refractive index anisotropy so that its optic axis is tilted from the normal direction to the film as disclosed in Japanese Laid-open Patent Publication No. 63-239421, it is difficult to efficiently obtain an uniform and large size phrase retarder film, and according to a method using a discotic liquid crystal compound as disclosed in Japanese Laid-open Patent Publication No. 6-214116, it is difficult to produce the liquid crystal compound and to uniformly orient the liquid crystal. In addition, this method is disadvantageous in cost.

In the case of the use of a chase retarder film having its optic axis tilted from the normal direction to the film and having positive refractive index anisotropy, although a satisfactory effect of the viewing angle characteristics improvement is obtained, according to a method in which the phase retarder film is cut from a polymer block oriented to have positive refractive index anisotropy so that its optic axis is tilted from the normal direction to the film as disclosed in Japanese Laid-open Patent Publication No. 5-080323, it is difficult to efficiently obtain an uniform and large size phase retarder film. Moreover, according to a method in which the phase retarder plate is formed by obliquely evaporating an inorganic dielectric onto the glass substrates as described in Applied Optics Vol. 28 (1989), pp. 2466–2482 disclosed in U.S. Pat. No. 5,504,603 and a method in which the phase retarder plate is formed by obliquely evaporating $Ta_2O_5$ onto the glass substrates as disclosed in WO96/10773, although a phase retarder plate can be obtained having its optic axis tilted from the normal direction to the plate and having positive refractive index anisotropy, since these methods use glass substrates, only a phase retarder plate can be obtained that is heavy in weight, lacks flexibility and is inferior in mass productivity.

Thus, for the phase retarder film used for improving viewing angle characteristics of the TN-LCD, no film has been found that meets the demands of the market including not only improving the viewing angle characteristics but also other performance.

In view of these circumstances, the inventors have developed a phase retarder film having a large area, being lightweight and being excellent in mass productivity in which the principal optic axis is tilted from the normal direction to the film by providing an oblique evaporation layer of an inorganic dielectric on at least one surface of a transparent polymer film with an intermediate layer of acrylic resin and the like between, so that the present invention has completed.

SUMMARY OF THE INVENTION

An object of present invention is to provide a phase retarder film which is suitable for improving viewing angle characteristics of the TN-LCD, and is easily and inexpensively obtained in large size.

The present invention is a phase retarder film in which at least one oblique evaporation layer of an inorganic dielectric having positive refractive index anisotropy and having its principal optic axis tilted 20 degrees to 70 degrees from the normal direction to the film is formed on at least one surface of a transparent polymer film with an intermediate layer between.

DETAILED DESCRIPTION OF THE INVENTION

As the transparent polymer film used in the present invention, although not specifically limited as long as being excellent in transparency and being uniform, a film formed of a thermoplastic polymer is preferably used because the thermoplastic polymer is easily made into films.

Examples of the thermoplastic polymer include cellulose polymers, polycarbonate polymers, polyarylate polymers, polyester polymers, acrylic polymers, polysulfone and polyether sulfone.

While polysulfone and polyether sulfone being excellent in heat resistance are advantageous for evaporation, cellulose polymers and polycarbonate polymers from which films being inexpensive and uniform are obtained are also preferably used.

When a transparent polymer film having a low in-plane retardation value is suitable, cellulose polymer films and acrylic polymer films whose intrinsic birefringence is low are particularly preferably used. When a retardation value of several tens of nm is necessary, polycarbonate polymer films, polyester polymer films, polysufone film and polyether sulfone film whose intrinsic birefringence is high are preferably used.

When an oblique evaporation layer of an inorganic dielectric is provided on a continuous film, cellulose triacetate films and polyether sulfone films are preferably used in which the film deformation is small caused by the radiant heat at the time of evaporation and the stress due to the film transportation.

While as methods for forming the transparent polymer film, the solvent casting method and the precision extrusion method with which the residual stress of the film is small may be used, the solvent casting method is preferably used in view of the uniformity of the formed films. For forming a film whose in-plane retardation value is low, the solvent casting method is particularly preferable.

Although the film thus obtained, particularly, the film formed by the solvent casting method, show the very low in-plane retardation value, the refractive index ($n_t$) in the thickness direction of the film is lower than the average in-plane refractive index ($n_p$) because of the in-plane orientation of the polymer at the time of film formation. For this reason, the transparent polymer film has a retardation value ($R'=(n_p-n_t)\times d$, where d is the thickness of the film) in the thickness direction of the film because of the birefringence in the thickness direction of the film, so that the transparent polymer film may be used not only as a mere base film for evaporation but also as a phase retarder film having its optic axis in the nearly normal direction to the film and having negative refractive index dielectric layer according to the present invention having positive refractive index anisotropy and having its principal optic axis is ted from the normal direction to the film. R' of the transparent polymer film is in the range of approximately 0 nm to 250 nm.

When R' of the transparent polymer film is insufficient with respect to a predetermined value, the value of R' may be adjusted by forming a layer including an layered inorganic compound described in U.S. Pat. No. 5,430,566 on the transparent polymer film.

The transparent polymer, film may be used as a uniaxially oriented film having an in-plane retardation value. In this case, the transparent polymer film may be formed by stretching a film formed by the solvent casting method or the precision extrusion method by use of the known stretching method such as stretching between rolls, tentering and the like. When the transparent polymer film is used as the uniaxially oriented film, the in-plane retardation value is normally set in the range of 100 nm or lower.

It should be noted that the uniaxial orientation in the present invention includes not only complete uniaxial orientation but also a certain extent biaxial orientation having an in-plane retardation value.

Although not specifically limited, the thickness of these transparent polymer films is normally set at approximately 50 $\mu$m to 50 $\mu$m.

In the present invention, in order for the oblique evaporation layer of an inorganic dielectric to come to have a predetermined retardation value necessary for using the film as the phase retarder film in forming the oblique evaporation layer of an inorganic dielectric on at least one surface of the transparent polymer film, the film is considerably great in thickness compared with ordinal evaporation film like an anti-reflection film formed by multilayer evaporation of a dielectric. Therefore, the intermediate layer is provided for improving the adhesion property to prevent the evaporation layer from cracking.

Examples of the intermediate layer used in the present invention include polymer films formed of acrylic resin, urethane resin, silicon resin, cardo resin and polysilazane.

These polymer films are formed in a manner such that a polymerized material is dissolved in a solvent and applied to a transparent polymer film or that a composition including a polymerization initiator and a monomer and/or an oligomer is applied to a transparent polymer film and polymerized by ultraviolet cure or thermosetting.

The method for applying the composition to the transparent polymer film is not specifically limited; known methods may be used such as comma coating method, die coaling method, direct gravure coating method and bar coating method.

For the cellulose polymer film and the polycarbonate polymer film and the polyester polymer film, ultraviolet curing acrylic resins are preferably used. For polymer films having high heat resistance such as polysulfone films and polyether sulfone films, thermosetting polysilazane may also be used.

The thickness of the polymer film used as the intermediate layer is not specifically limited as long as it is a thickness where an improvement in adhesion property is realized, and is set in the range of approximately 0.2 μm to 10 μm.

It is not preferable that the thickness is outside this range because when the thickness is approximately 0.2 μm or smaller, a uniform film by coating is not easily obtained and when the thickness is approximately 10 μm or greater, the adhesion property of the transparent polymer film and the intermediate layer degrades.

While the inorganic dielectric used in the present invention is not specifically limited as long as it can be formed into a thin film by evaporation, shows positive refractive index anisotropy when oblique evaporation is performed and has its principal optic axis tilted 20 degrees to 70 degrees from the normal direction to the film, for example, metallic oxides such as $Ta_2O_5$, $WO_3$, $SiO_2$, SiO, $Bi_2O_3$ and $Nd_2O_3$ are preferably used because they are excellent in transparency.

Of the metallic oxides, $Ta_2O_5$, $WO_3$ and $Bi_2O_5$ which readily come to have refractive index anisotropy and from which hard films are obtained are much preferably used.

The angle of oblique evaporation is defined by the angle between the line connecting the evaporation points on the film from the evaporation source and the normal to the film surface. By setting the evaporation angle in the range of approximately 50 degrees to 85 degrees, the angle between the principal optic axis of the dielectric layer and the normal direction to the film is the predetermined angle, namely approximately 20 degrees to 70 degrees. The specific evaporation angle is decided for each combination because it differs according to the combination or the transparent polymer film and the evaporation substance being used.

While the thickness of the obliquely evaporated inorganic dielectric layer is not specifically limited as long as it is equal to or greater than a thickness where anisotropy is generated in the growth of the evaporation particles to exhibit birefringence, it is set at a thickness where a predetermined retardation value is obtained in which the in-plane retardation value of the inorganic dielectric layer is in the range of approximately 20 nm to 200 nm. While the thickness differs according to the birefrinaence of the used substance and the angle of tilt of the principal optic in the range of approximately 0.2 μm to 5 μm, preferably in the range of approximately 0.4 μm to 1 μm.

In the present invention, at least one dielectric layer formed by oblique evaporation is provide. Moreover, the present invention includes, according to which viewing angle characteristics is to be improved in the LCD to which the present invention is applied, a dielectric layer including a plurality of layers having different tilt angles of the principal optic axis from the normal direction to the film, a dielectric film including a plurality of layers having same tilt angle and a combination thereof. In the case of oblique evaporation on a continuous film by use of general apparatus for continuous film, the tilt angle of the principal optic axis is continuously changed in the thickness direction.

As the method for the oblique evaporation used in the present invention, known methods may be used such as the electron beam evaporation method, the ion plating method and the sputtering method. In view of mass productivity, the electron beam evaporation method is preferably used.

Oblique evaporation onto a continuous film may be performed by providing, in an evaporation apparatus capable of continuously evaporating films, slits or shielding plates between the evaporation source and the film so that the inorganic dielectric which comes flying from unnecessary evaporation angles is cut off and only the inorganic dielectric that comes flying from a predetermined evaporation angle is selectively evaporated. At this time, in order for the inorganic dielectric to be efficiently evaporated onto the film, the evaporation source, the shielding plates and the film are disposed so chat the film passes immediately above the evaporation source.

Since a problem such that temperature increase of a polymer film induces deformation of the film can arise in the evaporation, it is preferable to provide radiant heat shielding plates so than excessive radiant heat is non applied.

While it is a problem that the film is deformed, since characteristics of the formed dielectric layer vary according to the film temperature at the time of oblique evaporation, it is preferable for the film guide roller to be capable of being temperature-controlled so that the film temperature at the evaporated portion may be controlled. While the temperature control range is less than the glass transition temperature of the polymer, preferably less than the thermal deformation temperature, it is much preferable that the guide roller can be cooled to 0° C. or lower.

When $Ta_2O_5$ is used as the evaporation material, although it may be used alone, a mixture of $Ta_2O_5$ and Ta is mulch preferable in view of the ease of evaporation, the evaporation rate and the radiant heat. The mixture ratio between $Ta_2O_5$ and Ta is normally in the range of approximately 1:0.05 to 1:1.

When a substance such as $Ta_2O_5$ is used which can be colored because of insufficiency in oxygen caused by the breakage of the composition ratio between tantalum and oxygen at the time of evaporation, transparency may be improved by admitting oxygen gas into the evaporation apparatus as necessary to thereby adjust the composition ratio of oxygen in the evaporation film.

The amount of oxygen gas admittance is normally set in the range of approximately 5 sccm to 30 sccm. It is not preferable that the amount be outside this range because when the amount is approximately 5 sccm or smaller, the effect of oxygen admittance is insufficient and when the amount is approximately 30 sccm or greater, the degree of vacuum increases to decrease the evaporation rate.

While the phase retarder film of the present invention is for use as a phase retarder film for improving the viewing angle characteristics of the TN-LCD, it may also be used as a phase retarder film for improving the viewing angle characteristics of a super twisted nematic (STN) LCD.

In this case, the tilt angle of the principal optic axis of the inorganic dielectric layer from the normal direction to the film, the retardation value of the inorganic dielectric layer and the retardation value of the transparent polymer film are set at different values accordingly.

The phase retarder film of the present invention is a phase retarder film having its principal optic axis tilted from the normal direction to the film and having positive refractive index anisotropy which film is suitable for improving viewing angle characteristics of the TN-LCD. By employing the structure of the present invention, a large size film may be easily and inexpensively obtained.

EXAMPLES

Hereinafter, the present invention will be illustrated in detail with reference to the following examples.

The measurement of the retardation will be illustrated embodiments was carried out by an ordinary method by use of a polarizing microscope with monochromatic light of 546 nm.

The tilt angle of the principal optic axis was obtained by measurements on the basis of ordinary methods known to those people skilled in the art assuming that the refractive index structure was uniaxially.

Example 1

After a cellulose triacetate film (produce name: Fuji TAC SH-80, made by Fuji Photo Film Co., Ltd.) was coated with an ultraviolent-curing acrylic resin by a comma coater, the film was cured by ultraviolent irradiation, so that a transparent polymer film was obtained in which an acrylic resin film with a thickness of approximately 5 $\mu$m was formed as the intermediate layer.

The transparent polymer film having the intermediate layer formed therein was set in a holder of a evaporation apparatus, evacuation was performed until the degree of vacuum reached $2\times10^{-5}$ Torr, and an oblique evaporation layer of $SiO_2$ with a thickness of 1.02 $\mu$m was formed using $SiO_2$ as the evaporation material by the electron beam evaporation method at an evaporation angle of 70 degrees and at a film temperature of approximately 65° C. to obtain a phase retarder film.

The appearance of the phase retarder film was visually evaluated and it was found that there was no deformation of the polymer film due to he radiant heat at the time of evaporation and that there was no peeling of the evaporation layer due to cracks.

In the phase retarder film, the in-plane retardation value was 24 nm and the principal optic axis was tilted 29 degrees from the direction of the normal to the film.

Example 2

A transparent polymer film having an intermediate layer formed therein which was formed in a similar manner to that of Example 1 was set in a holder of a evaporation apparatus, evacuation was performed until the degree of vacuum reached $2\times10^{-5}$ Torr, and an oblique evaporation layer of $Ta_2O_5$ with a thickness of 0.65 $\mu$m was formed using $Ta_2O_5$ as the evaporation material by the electron beam evaporation method at an evaporation angle of 70 degrees and at a film temperature of approximately 120° C. to obtain a phase retarder film.

The appearance of the phase retarder film was visually evaluated and it was found that there was no deformation of the polymer film due to the radiant heat at the time or evaporation and that there was no peeling of the evaporation layer due to cracks.

In the phase retarder film, the in-plane retardation value was 34 nm and the principal optic axis was tilted 27 degrees from the direction of the normal to the film.

Example 3

A transparent polymer film having an intermediate layer formed therein which was formed in a similar manner to that of Example 1 was set in a holder of a evaporation apparatus, evacuation was performed until the degree of vacuum reached $2\times10^{-5}$ Torr, and an oblique evaporation layer of $Ta_2O_5$ with a thickness of 0.76 $\mu$m was formed using a mixture of $Ta_2O_5$ and Ta (product name: OA-100, made by Optron Inc.) as the evaporation material by the electron beam evaporation method at an evaporation angle of 70 degree and at a film temperature of approximately 102° C. to obtain a phase retarder film.

The appearance of the phase retarder film was visually evaluated and it was found that there was no deformation of the polymer film due to the radiant heat at the time of evaporation and that there was no peeling of the evaporation layer due to cracks.

In the phase retarder film, the in-plane retardation value was 40 nm and the principal optic axis was tilted 27 degrees from the direction or the normal to the film.

Example 4

After a film with a thickness of 100 $\mu$m formed by the solvent casting method by dissolving polycarbonate (product name: Panlite C-1400, made by Teijin Chemicals Ltd.) in methylene chloride was coated with an ultraviolet-curing acrylic resin by a coater, the film was cured by ultraviolet irradiation, so that a transparent polymer film was obtained in which an acrylic resin with a thickness of approximately 5 $\mu$m was formed as the intermediate layer.

The transparent polymer film having the intermediate layer formed therein was set in a holder of a evaporation apparatus, evacuation was performed until the degree of vacuum reached $2\times10^{-5}$ Torr, and an oblique evaporation layer of $Ta_2O_5$ with a thickness of 0.60 $\mu$m was formed using $Ta_2O_5$ as the evaporation material by the electron beam evaporation method at an evaporation angle or 65 degrees and at a film temperature of approximate 120° C. to obtain a phase retarder film.

The appearance of the phase retarder film was visually evaluated and it was found that there was no deformation of the polymer film due to the radiant heat at the time of evaporation and that there was no peeling of the evaporation layer due to cracks.

In the phase retarder film, the in-plane retardation value was 30 nm and the principal optic axis was tilted 29 degrees from the direction of the normal to the film.

Example 5

After a cellulose triacetate film (product name: Fuji TAC SH-80, made by Fuji Photo Film Co., Ltd.) was coated with an ultraviolet-curing acrylic resin by a comma coater, the film was cured by ultraviolet irradiation, so that a transparent polymer film was obtained in which an acrylic resin film with a thickness of approximately 5 $\mu$m was formed as the intermediate layer. This film was slit into strips with a width of 125 mm to obtain a continous film.

The transparent polymer film having the intermediate layer formed therein was set in a holder of a continuous evaporation apparatus, evacuation was performed until the degree of vacuum reached $7\times10^{-4}$ Torr, a shielding plate was disposed so that the evaporation angle was 80 degrees to 45 degrees (the angle to the film surface immediately above the evaporation source was 72 degrees), and an oblique evaporation layer of $Ta_2O_5$ with a thickness of approximately 0.6 $\mu$m was formed using a mixture of $Ta_2O_5$ and Ta (product name: OA-100, made by Optron Inc.) as the evaporation material by the electron beam evaporation method at an oxygen admittance amount of 45 sccm to obtain a phase retarder film.

The appearance of the phase retarder film was visually evaluated and it was found that there was no deformation of the polymer film due to the radiant heat at the time of evaporation and that there was no peeling of the evaporation layer due to cracks.

In the phase retarder film, the in-plane retardation value was 25 nm, and the tilt angle of the principal optic axis continuously varied fin the thickness direction of the film according to the variation of the evaporation angle at the time of continous evaporation. The tilt angle of the principal optic axis was measured approximately 30 degrees from the direction of the normal to the film, assuming that the angle did not vary.

Comparative Example 1

After a cellulose triacetate film (product name: Fuji TAC SH-80, made by Fuji Photo 3Film Co., Ld.) was set in a holder of an evaporation apparatus without the intermediate layer being provided, evacuation was performed until the degree of vacuum reached $2\times10^{-5}$ Torr, and an oblique evaporation layer of $Ta_2O_5$ with a thickness of 0.68 µm was formed using $Ta_2O_5$ as the evaporation material by the electron beam evaporation method at an evaporation angle of 70 degrees and at a film temperature of approximately 123° C. to obtain a phase retarder film.

The apparatus of the phase retarder film was visually evaluated and it was found that the cellulose triacetate film was deformed due to the radiant heat at the time of the evaporation. In addition, cracks were produced to cause the evaporation layer to partly peel off.

In the phase retarder film, the in-plane retardation value was 37 mm and the principal optic axis was tilted 27 degrees from the direction of the normal to the film.

What is claimed is:

1. A phase retarder film comprising:
   at least one oblique evaporation layer of an inorganic dielectric; at least one surface of a transparent polymer film having said oblique evaporation layer formed thereon; an intermediate layer positioned between said oblique evaporation layer and said polymer film; said oblique evaporation layer having a positive refractive index anisotropy and a principal optic axis tilted 20 degrees to 70 degrees from a direction of a normal to said transparent polymer film.

2. A phase retarder film according to claim 1, wherein said transparent polymer film is a thermoplastic polymer film.

3. A phase retarder film according to claim 1, wherein said transparent polymer film is a film formed of a thermoplastic polymer by a solvent casting method.

4. A phase retarder film according to claim 2 or claim 3, wherein said thermoplastic polymer film is a cellulose polymer, a polycarbonate polymer, a polyarylate polymer, a polyester polymer, an acrylic polymer, polysulfone or polyether sulfone.

5. A phase retarder film according to claim 1, wherein a in-plane retardation value of said transparent polymer film is less than 100 nm.

6. A phase retarder film according to claim 1, wherein said intermediate layer is a polymer film formed of an acrylic resin, an urethane resin; a silicon resin, polysilazane or a cardo resin.

7. A phase retarder film according to claim 1, wherein said intermediate layer is 0.2 µm to 10 µm in thickness.

8. A phase retarder film according to claim 1, wherein said inorganic dielectric is at least one kind of compound selected from a group consisting of $Ta_2O_5$, $WO_3$, $SiO_2$ and $Bi_2O_3$.

9. A phase retarder film according to claim 1, wherein said inorganic dielectric is $Ta_2O_5$.

10. A phase retarder film according to claim 1, wherein said oblique evaporation layer of the inorganic dielectric is 0.2 µm to 5 µm in thickness.

11. A phase retarder film according to claim 1, wherein said oblique evaporation layer of the inorganic dielectric is formed by using a mixture of $Ta_2O_5$ and Ta as an evaporation material.

12. A phase retarder film according to claim 1, wherein said oblique evaporation layer of the inorganic dielectric admitted by using a mixture of $Ta_2O_5$ and Ta as an evaporation material.

* * * * *